Inventors:
Peter Maurice Wright
Percy Samuel Brandon
Attorneys:
Baldwin & Wight

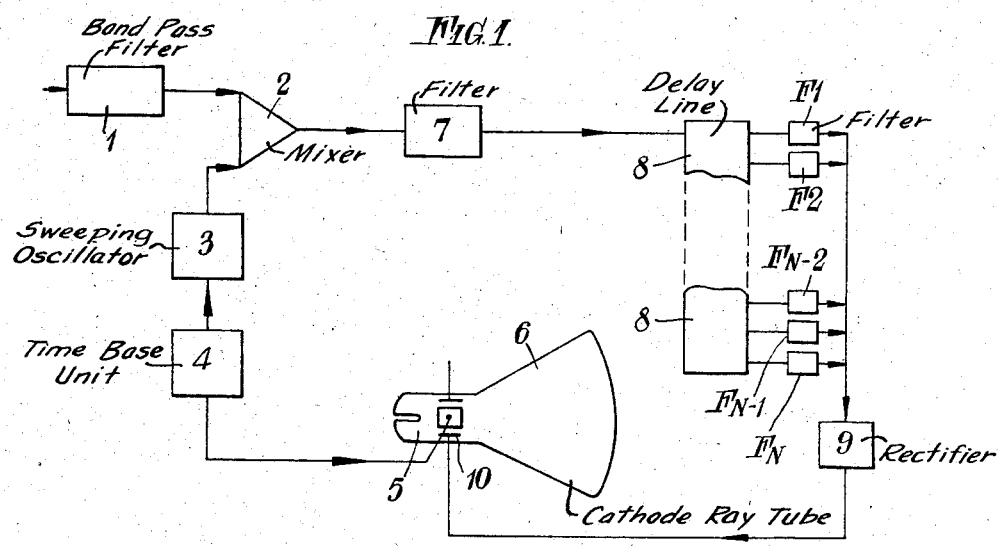
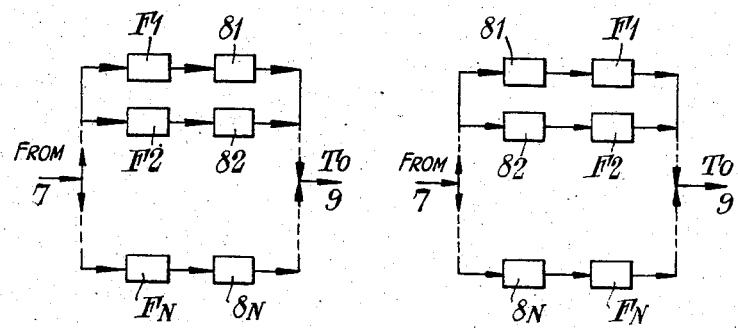
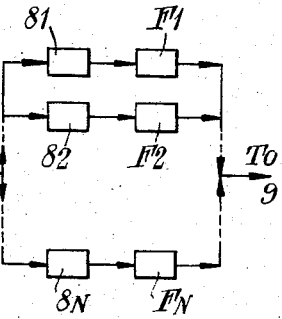
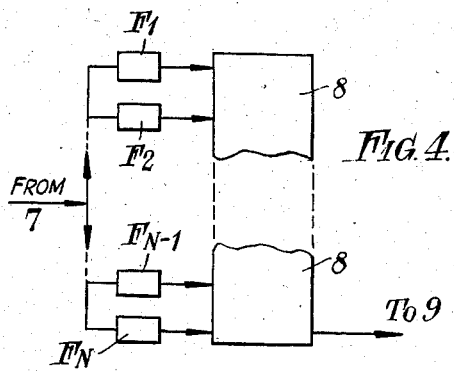

United States Patent Office 2,897,442
Patented July 28, 1959

2,897,442

FREQUENCY SPECTRUM ANALYZERS

Peter Maurice Wright and Percy Samuel Brandon, Chelmsford, England, assignors to Marconi's Wireless Telegraph Company Limited, London, England Application October 13, 1953, Serial No. 385,830

Claims priority, application Great Britain October 24, 1952

6 Claims. (Cl. 324—77)

This invention relates to frequency spectrum analyzers i.e. to devices for analyzing signals which may occur at different frequencies within a band of frequencies. Though not limited to its application thereto the invention is particularly adapted for and primarily intended for use in radar systems of the so-called frequency modulated, Doppler frequency and similar types wherein received echo signals are converted into beat frequencies which lie within a predetermined band which has to be analyzed to separate the beat frequencies corresponding to the various targets from which the echo signals are reflected and thus to enable the said targets to be displayed on a cathode ray tube. In such systems frequency spectrum analyzers are required to separate the different beat frequencies for display purposes.

Broadly speaking there are two classes of frequency spectrum analyzers in use in radar systems of the types in question. In the first class, generally termed "panoramic" spectrum analyzers, the echo signals, or signals derived therefrom, are mixed with oscillations from a sweeping oscillator the oscillations of which are frequency modulated (usually in accordance with a saw tooth law) and the signals resulting from mixing are fed to a band pass filter of fixed predetermined pass frequency and narrow predetermined band width. In effect, therefore, the combination of mixer and sweeping oscillator sweeps the incoming signal band (more accurately, a band derived therefrom) across the pass band of the filter. The defect of this class of analyzer is the time taken to analyze the signal band.

In the other class of analyzer—sometimes termed the multi-analyzer class—the whole band of signals or, in usual practice, a band derived therefrom by heterodyning, is fed to a plurality of separate filters of different, adjacent, pass bands, which between them cover the whole band, the more the number of filters provided the greater the resolution. This class of analyzer effects analysis in the shortest possible time but has the defect of complexity for the means necessary for displaying the separated signals resulting from analysis are considerably more complex than the comparatively simple means which are all that are necessary with the panoramic type of analyzer.

The present invention seeks to provide improved analyzers combining the main advantages of the two known classes of analyzers above referred to without their defects.

According to this invention a frequency spectrum analyzer comprises a mixer in which are mixed signals within a band of frequencies to be analyzed and locally generated oscillations from a frequency modulated sweeping oscillator having a frequency deviation preferably approximately equal to the width of said band, and a dispersive network fed with the output from said mixer and adapted to convert the frequency modulated trains which constitute said output into signal pulses or bursts of signals occurring at times dependent on the signal frequencies in said band.

The dispersive network converts the frequency modulated signal trains which constitute the output of the mixer into pulses which occur at times dependent on the signal frequency.

A convenient form of display arrangement for the output from the dispersive network comprises a cathode ray tube having one co-ordinate deflection supplied from said output and the other synchronized with the sweeping oscillator.

A preferred form of dispersive network consists of a tapped artificial delay line and a plurality of narrow band filters with adjacent pass bands each connected to a different tapping on the line and all feeding a common output circuit, the arrangement being such that the delay imposed on any frequency fed to the output (in relation to the occurrence of that frequency in the input to the network) is a suitable function of the frequency in question. With this arrangement used in combination with a display arrangement as above described the display tube will produce on its screen a display resembling a so-called A scan, the equivalent of the time base of the A scan being synchronized with the sweeping oscillator and the equivalent of the "blips" of an A scan being provided by the separated signals in the output from the dispersive network.

The dispersive network may take forms other than that above described. Instead of employing a single tapped delay line with a plurality of filters feeding into a common output and each fed from a different tapping the network may comprise a plurality of branches in parallel both on their input and output sides and each consisting of a filter and a delay line in series (either the filter in front of the delay line or vice versa) the filters being of narrow adjacent pass bands and the delay lines imposing different delays so that, as before, the delay imposed on any frequency in the output is a suitable function of frequency. In another form of dispersive network there is again a single tapped delay line and a plurality of filters, one connected to each tapping, but instead of feeding the line from the input and feeding the output from all the filters, the line supplies the output and the filters are all fed in parallel on the input side.

The sweeping oscillator is preferably amplitude modulated, particularly when the invention is applied to radar system, though whether or not such modulation is used is entirely a matter of design choice since the modulation may be purely frequency and the individual oscillations may be all of the same amplitude. As will be seen later, however, certain advantages (and some disadvantages also) are obtained if the sweeping oscillator amplitude is caused to fall away smoothly, preferably in accordance with a cosine squared law, from a maximum at the middle of the frequency sweep to minima at the beginning and end. If gain modulation is used in the radar system as for example as described in British Patent No. 647,583 it is unnecessary to modulate the amplitude of the oscillator also.

The invention is illustrated in and further explained in connection with the accompanying diagrammatic and schematic drawings.

Fig. 1 is a block diagram showing one form of frequency spectrum analyzer embodying our invention;

Fig. 2 shows one arrangement of dispersive network which may be used in the circuit of Fig. 1;

Fig. 3 shows a modified form of dispersive network which may be substituted in the circuit of Fig. 1;

Figure 5:
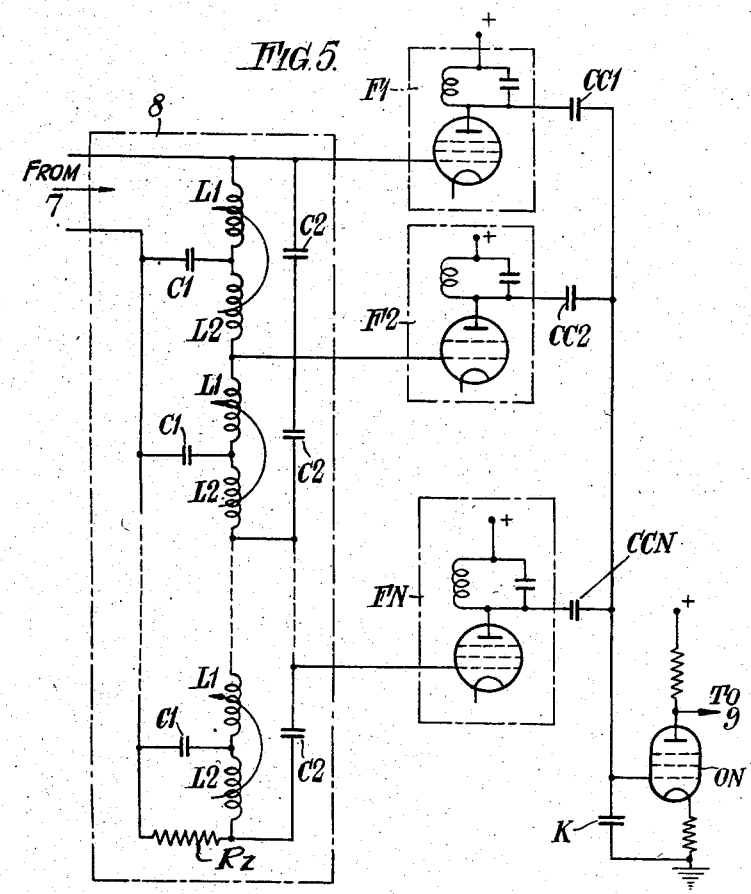
Figure 6:
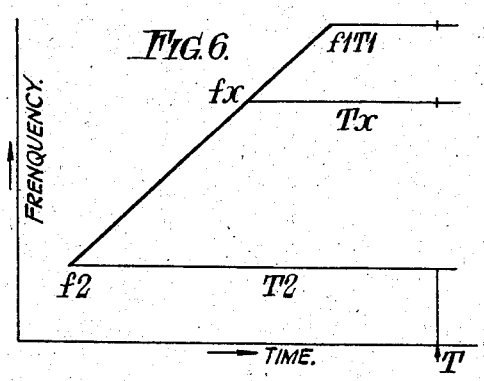
Figure 7:
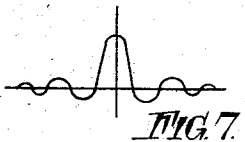
Figure 8:
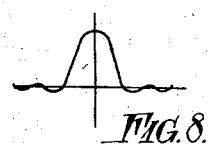
Figure 9:
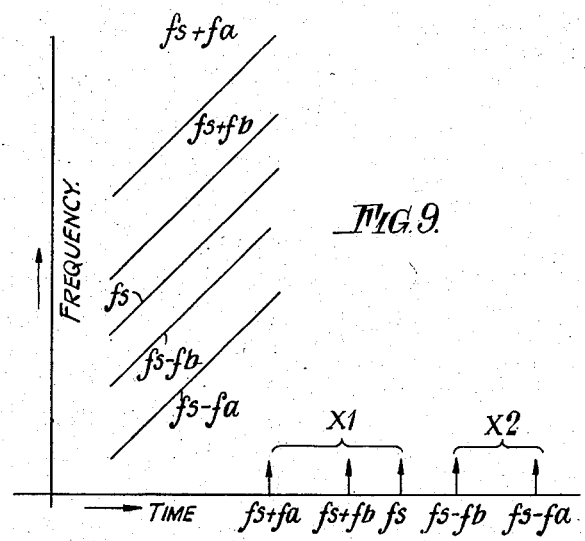
Figure 10:
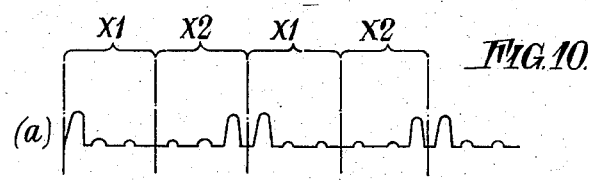
Figure 11:
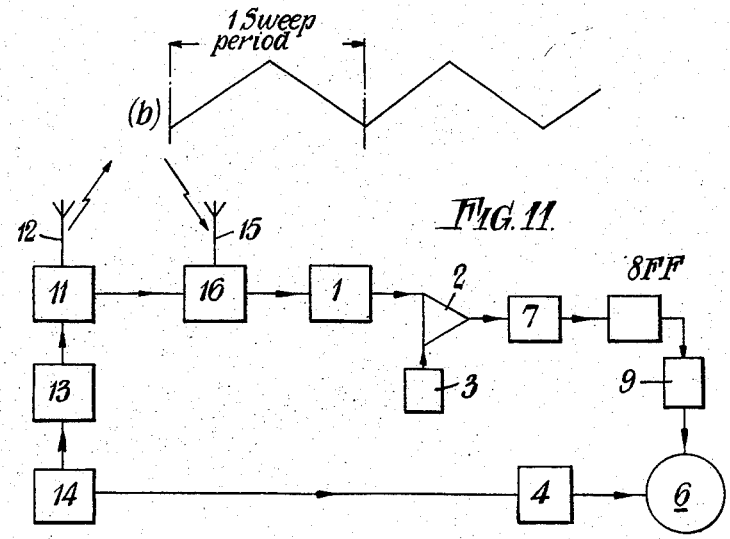

Fig. 4 schematically illustrates a still further arrangement of dispersive network which may be employed in the circuit of Fig. 1;

Fig. 5 illustrates the circuit components of the dispersive network shown in Fig. 1;

Fig. 6 is a graph showing the relationship of frequency with respect to time in the circuit of Fig. 1;

Fig. 7 shows the characteristic of an output pulse dispersed by the circuit of Fig. 1;

Fig. 8 shows a modified form of output pulse obtainable by amplitude modulating the sweep oscillator of the circuit of Fig. 1;

Fig. 9 is a graph of five lines of frequency change produced in the output of the mixer of Fig. 1;

Fig. 10 illustrates the doubled or mirror image train repeated twice in relation to the time base wave form applied between the horizontal deflection plates of the display tube in the circuit of Fig. 1; and Fig. 11 shows in block diagram the application of our invention to a frequency modulated radar system.

Referring to Fig. 1 which is a block diagram of one form of analyzer in accordance with the invention the band $f_a$ to $f_b$ of frequencies to be analyzed is passed through a band pass filter 1 adapted to pass this band to a mixer 2. The second input to the mixer 2 is supplied by a sweeping oscillator 3 whose frequency is modulated in accordance with a linear saw tooth law from a frequency $f_1$ to $f_2$ the deviation frequency $S = f_1 - f_2$ being equal to $f_a - f_b$. The repetition frequency $f_r$ of the oscillator 3 is determined by a time base unit 4 of this frequency which also supplies the time base deflection to the deflection plates 5 of a display cathode ray tube 6.

Output from the mixer 2 is fed to a filter 7 designed to select the sum or difference band of frequencies resulting from mixing the two inputs to the mixer. In the present example it is assumed that the difference band is selected. This band is fed to a tapped delay line 8 from each tapping of which a narrow pass band filter $F_1 \ldots F_N$ is fed. The mid-frequencies of adjacent filters are separated by $f_r$ c./s. and each has a pass band $f_r$ c./s. wide. Between them they cover a total band extending from $f_2 - f_a$ to $f_1 - f_b$ c./s. The filter outputs are combined and fed to a common rectifier 9 which feeds the other deflection plates 10 of the tube 6.

Suppose the band of frequencies $f_a$ to $f_b$ is required to be displayed with a resolution of $\Delta f$. This means that the time for analysis must be at least $$\frac{1}{\Delta f} \text{ secs.}$$

Then the sweeping oscillator is linearly swept through its range $f_1$ to $f_2$ ($= S$) in the time $$\frac{1}{\Delta f} \text{ secs.}$$

so that the rate of change of frequency $$\frac{df}{dt}$$

of this oscillator is given by $$\frac{df}{dt} = S\Delta f$$

$\Delta f$ is dependent upon the resolution time required. $\Delta f$ is a design parameter and the actual value thereof and the method by which it is determined and the actual increment of frequency it represents is governed by the actual requirement for any particular purpose. The delay time (T) characteristic of the dispersive network consisting of the line 8 and filters $F_1$ to $F_N$ is chosen such that $$-\frac{dt}{df} = \frac{1}{S\Delta f}$$

and it must delay all possible frequencies fed thereto at least over the band $f_2 - f_a$ to $f_1 - f_b$.

Consider an instant when the frequency from oscillator 3 is $f_s$ c./s. Suppose $f_a$ is the highest frequency in the band to be analyzed. The frequency resulting from mixing $f_a$ and $f_s$ passed by the filter 7 is $f_a - f_s$ and will be the highest frequency that can be fed to the dispersive network at the instant in question. Similarly $f_b - f_s$ is the lowest frequency that can then be fed to the network.

The time interval ($Ta$) between the appearance, in the network output, of signals of frequency $f_a - f_s$ and $f_b - f_s$ is given by $$Ta = \frac{f_a - f_b}{df/dt}$$

and the number (N) of resolvable points is given by $$N = TaS = \frac{f_a - f_b}{\Delta f}$$

It is thus seen that although the analyzer of this invention imposes a delay at least equal to one frequency excursion of the sweeping oscillator, the train of pulses into which it transforms the input spectrum may be produced in any desired period of time depending on the choice of $df/dt$ i.e. the slope of the saw tooth of the oscillator 3. Indeed it is possible to make $$Ta = \frac{1}{\Delta f}\left(\frac{f_a - f_b}{S}\right)$$

i.e. to make the length of the train of output pulses equal to the sweep time of the oscillator 3 by making the deviation thereof equal to the width of the band of frequencies to be analyzed. If the deviation S is increased the length of the said train is reduced and vice versa. If the sweeping oscillator 3 is amplitude modulated the foregoing argument is not effected except that the number of resolvable points is halved, becoming $$\frac{TaS}{2}$$

i.e. the pulse length is doubled. This feature of amplitude modulation will be better understood from the theory at the end of this specification.

In Fig. 1 the filter 7 is described as passing only the difference frequencies. The arrangement could obviously be modified to work with the sum frequencies selected. What is not so obvious is that both sum and difference frequencies can be used. If this is done the dispersive network will (if of wide enough pass band) produce two trains of pulses which will be mirror images of one another in time, centered about the pulse due to oscillator 3 itself. A spectrum display can still be obtained on a cathode ray tube by subjecting the ray to oppositely directed time base deflections, deflecting one way for one train and the opposite way for its (time) mirror image, the timing of the oppositely directed deflections being such that the "paints" for the pulses in one train were coincident with those for the other. This type of arrangement has advantages for analyzers for frequencies going down to very low values—near zero—since it avoids the difficulties which would arise in such cases of separating the sum and difference frequencies.

Figs. 2, 3 and 4 show different forms of dispersive network which may be substituted for that in Fig. 1. In Fig. 2 $F_1 F_2 \ldots F_n$ are filters corresponding to the similarly referenced filters in Fig. 1 and $8_1 8_2 \ldots 8_N$ are separate delay lines providing the delays given by the line 8 of Fig 1 up to the first, second and Nth tapping points thereon, respectively. The network of Fig. 3 differs from that of Fig. 2 only in that the positions of the filters and delay lines are interchanged in the parallel branches, while the network of Fig. 4 differs from that of Fig. 1 only in that, in Fig. 4, the filters $F_1 F_2 \ldots F_N$ feed into taps on the line 8 whereas in Fig. 1 they are fed from taps on that line.

Fig. 5 shows in more detail a practical form for a dispersive network as shown in Fig. 1. The delay line consists of a series of sections, one between each pair of taps, each consisting of two mutually coupled series arm inductances $L_1$ $L_2$ and shunt and series arm condensers $C_1$ $C_2$. The whole line is terminated by a non-reflecting terminating resistance $R_z$. Each filter unit $F_1$ $F_2$ ... $F_N$ comprises a valve with a suitably tuned resonant anode circuit and the combined output is fed through an output valve ON. The coupling capacities $CC_1$ $CC_2$ ... $CC_N$ are made small enough to ensure that cross coupling between line sections is tolerable. The condenser K is large. Attenuation of signals is compensated by the gain provided by the valves. Of course, other arrangements may be used e.g. in some cases it may be necessary to separate adjacent filters by two bridged T delay sections instead of a single section as shown and in cases where very small cross coupling between sections is necessary it may be necessary to provide valves to feed the separate filter outputs to the common output line, i.e. a valve may be inserted between the output terminal of each filter and said common line.

The normal and preferred arrangement is that in which the mean frequencies of adjacent filters differ by the repetition frequency $f_r$ of the oscillator 3 as with this arrangement repetitions of the pulse trains will coincide as displayed on the display tube. By making the pass bands of the filters wide enough to pass the input amplitude pulse i.e. by making these widths equal to the sweep repetition frequency the spectrum of the input band corresponding to each sweep can be separated from repetitions for each sweep will produce only one pulse from each filter. If amplitude modulation is used the band widths should be wide enough to pass the modulation and, indeed, the filters may be separated by twice the sweep repetition frequency.

By separating the filters by higher multiples of the sweep frequency and increasing the deviation (S) by a corresponding ratio, also decreasing the period of the time base for the tube 6 in the same ratio, it is possible to produce and display a plurality of successive pulse trains (which will superimpose in display) from each sweep of the oscillator 3.

The remaining figures are purely explanatory figures which assist in an understanding of the way in which the dispersive network produces the pulses for display.

Fig. 6 shows graphically in frequency (ordinates) against time (abscissae) how the frequency produced from an input train of frequencies by frequency modulating (mixing) it with the output from the saw tooth frequency modulated oscillator 3 changes with time. It will be seen that it changes at a constant rate. As already explained the delay line 8 has a characteristic such that all frequencies are so delayed, in dependence on the frequency, that they occur in phase at a later time T. The delay time for the highest frequency $f_1$ is $T_1$, that for the lowest $f_2$ is $T_2$ and those for intermediate frequencies e.g. frequency $f_x$ are intermediate between $T_1$ and $T_2$ e.g. $T_x$. The resultant output pulse for any input frequency is of the order of $$\frac{1}{S} \text{ secs.}$$

wide (here S is, as before, the deviation of oscillator 3). The pulse will be in shape approximately a sin $x/x$ pulse as represented in Fig. 7 with the main "side lobes" (those next on either side of the main peak) of somewhere about 20% of the main peak amplitude as a rule. This form of pulse is not always convenient since the side lobes make it difficult to distinguish, when displayed, from other smaller pulses due to closely adjacent input frequencies and therefore occurring at closely adjacent times. A better form of pulse can be obtained by amplitude modulating the sweep oscillator 3 (for example, preferably in accordance with a cosine squared law) so that the middle frequency of the sweep is of maximum amplitude, the amplitude falling away smoothly to zero or nearly so at the beginning and end of the frequency sweep. A much better shape of pulse, with much smaller side lobes is obtained if this is done, Fig. 8 illustrating the sort of pulse obtained. As already stated if amplitude modulation of this nature is used the deviation must be doubled (as compared to the value S used in the case of a constant amplitude oscillator 3) to give the same resolution over the same band analyzed.

Fig. 9 shows in manner similar to that adopted for Fig. 6 five lines of frequency change produced in the output of the mixer 2 (Fig. 1) namely the lines for $f_s+f_a$, $f_s+f_b$, $f_s$, $f_s-f_b$, and $f_s-f_a$. In other words, Fig. 9 shows the middle line $f_s$ and the sum and difference lines obtained by beating $f_s$ with the highest frequency $f_a$ in the input band and the lowest frequency $f_b$ in that band. Suppose (as has already been envisaged) the filter 7 can pass both sum and difference frequencies. Then the relation in time of the pulses due to $f_a$ $f_b$ and $f_s$ produced in the output of the dispersive network—i.e. fed to the rectifier 9 of Fig. 1—will be as indicated by the short arrow headed lines upstanding from the abscissa line of Fig. 9, there being two pulses, whose center lines are marked $f_s+f_a$ and $f_s-f_a$ due to the frequency $f_a$ and symmetrically disposed each side of the pulse $f_s$ (due to the sweep frequency) and similarly two pulses whose center lines are marked $f_s+f_b$ and $f_s-f_b$ similarly symmetrically disposed about $f_s$. In other words, as already explained, there are two trains produced as indicated respectively by the brackets X1 and X2. Fig. 10 shows such at (a) a doubled or mirror image train repeated twice, X1 and X2 being used as in Fig. 9 while at (b) is shown a form of time base wave form which may be applied between the horizontal deflection plates of the display tube to ensure that the pulses in successive halves X1 and X2 of each double train are superimposed in display because the time base deflection is in one direction in one half and the opposite in the other.

Fig. 11 shows a simple way of applying the invention to a frequency modulated (F.M.) radar system. Here a radio transmitter 11 transmits from aerial 12 a saw tooth law frequency modulated wave produced by a modulator 13 controlled by a master time control unit 14. Received echoes obtained on a receiving aerial 15 are mixed at 16 with energy from the transmitter 11 to produce in known manner beat notes in a range $f_a-f_b$ to be analyzed. The parts 1, 2, 3, and 7 and 6 are, corresponding respectively with the similarly numbered filter, mixer, sweep oscillator, difference frequency, filter and display tube of Fig. 1 while the dispersive network comprising line 8 and filters $F_1$ ... $F_N$ of Fig. 1 is represented by the rectangle 8FF in Figure 11. The sweep oscillator 3 sweeps over the range $f_a$ to $f_b$ in $T_r$ secs. where $T_r$ is the transmitter repetition period while the time base 4 is synchronized with the transmitter modulation.

With this system fixed targets will give repeated identical beat note bursts which consist of narrow bands centered around integral multiples of the transmitter repetition frequency. The effect of target motion is merely to shift these bands by Doppler effect. The filters incorporated at 8FF (and elsewhere) must therefore have bandwidths wide enough to cover Doppler shift and, of course, they must be quick enough to respond to rapidly appearing and disappearing targets.

Of course, the invention is not limited to the type of display envisaged in Figs. 1 and 11 and, by suitable modifications other forms of display e.g. P.P.I. display, can be given.

While we have described our invention in certain preferred embodiments, we realize that modifications may be made, and we desire that it be understood that no limitations upon our invention are intended other than may be imposed by the scope of the appended claims.

What we claim as new and desire to secure by Letters Patent of the United States is as follows:

1. A frequency spectrum analyzer comprising a frequency modulated sweep oscillator having a predetermined repetition frequency, a mixer in which are mixed signals within a band of frequencies to be analyzed and oscillations from said frequency modulated sweep oscillator, a display arrangement comprising a cathode ray tube, means for applying a voltage from said sweep oscillator to deflecting means on the cathode ray tube whereby one coordinate deflection is synchronized with the sweep oscillator, a dispersive network comprising delay line means, means for applying the output of said mixer through the dispersive network, whereby a delay is imposed in dependence upon the input frequency to the line, and a plurality of narrow band filters having mutually different transmission frequencies to a common output circuit wherein the outputs from all the filters combine simultaneously to form a pulse which supplies the other coordinate deflection to said cathode ray tube.

2. An analyzer as set forth in claim 1 wherein the dispersive network consists of a tapped artificial delay line and a plurality of narrow band filters with adjacent pass bands each connected to a different tapping on the line whereby the delay imposed is dependent upon the input frequency to the line, said filters all feeding a common output circuit.

3. An analyzer as set forth in claim 1 wherein the dispersive network comprises a plurality of branches in parallel both on their input and output sides and each consisting of a filter and a delay line in series the filters being of narrow adjacent pass bands and the delay lines imposing different delays so that the delay imposed on any frequency in the output is a function of frequency.

4. An analyzer as set forth in claim 1 wherein the dispersive network comprises a single tapped delay line and a plurality of filters, one connected to each tapping, the line supplying the output and the filters being all fed in parallel on the input side.

5. An analyzer as set forth in claim 1 wherein the frequency deviation of the frequency modulated sweeping oscillator is approximately equal to the width of the band of frequencies to be analyzed.

6. An analyzer as set forth in claim 1 wherein the sweeping oscillator is amplitude modulated with an amplitude which falls away smoothly from a maximum at the middle of the frequency sweep to minima at the beginning and end.

References Cited in the file of this patent

UNITED STATES PATENTS

| | | |
|---|---|---|
| 1,994,232 | Schuck | Mar. 12, 1935 |
| 2,159,790 | Freystedt | May 23, 1939 |
| 2,403,983 | Koenig | July 16, 1946 |
| 2,425,003 | Potter | Aug. 5, 1947 |
| 2,530,693 | Green | Nov. 21, 1950 |
| 2,602,836 | Foster | July 8, 1952 |